United States Patent [19]

Cinacchi

[11] Patent Number: 4,905,476
[45] Date of Patent: Mar. 6, 1990

[54] DEVICE FOR LOW TEMPERATURE REFRIGERATIVE DRYING OF COMPRESSED AIR (AND/) OR OTHER GASES

[75] Inventor: Roberto A. Cinacchi, Buenos Aires, Argentina

[73] Assignee: Osmi S.R.L., Buenos Aires, Argentina

[21] Appl. No.: 317,518

[22] Filed: Mar. 1, 1989

[30] Foreign Application Priority Data

Mar. 7, 1988 [AR] Argentina .............................. 310.243

[51] Int. Cl.⁴ ............................................. F25D 17/06
[52] U.S. Cl. ........................................... 62/93; 62/198
[58] Field of Search .................... 62/13, 89, 93, 198

[56] References Cited

U.S. PATENT DOCUMENTS

| | | | |
|---|---|---|---|
| 3,585,808 | 6/1971 | Huffman | 62/93 |
| 3,596,474 | 8/1971 | Bloxham et al. | 62/93 |
| 3,739,594 | 6/1973 | Freese | 62/93 |
| 4,193,443 | 3/1980 | Nanaumi et al. | 62/93 |
| 4,253,315 | 3/1981 | Fiedler | 62/93 |
| 4,597,268 | 7/1986 | Andersson | 62/93 |

*Primary Examiner*—Ronald C. Capossela

*Attorney, Agent, or Firm*—Fleit, Jacobson, Cohn, Price, Holman & Stern

[57] ABSTRACT

A device for low temperature refrigerative drying of compressed air and other gases includes a gas/gas heat exchanger in one passage of which a gas to be dried is pre-refrigerated by heat exchange with gas which has already been refrigeratively dried. The pre-refrigerated gas is then passed through a trap to remove liquid therefrom and then selectively supplied to a gas passage in one of a pair, or more, of evaporators wherein the gas is refrigeratively dried at low temperature by heat exchange with a refrigerant, after which the refrigeratively dried gas is circulated through the other passage of the gas/gas heat exchanger and then discharged for use. Each evaporator is provided with a refrigerant circuit selectively supplied from a refrigerant gas condenser unit with high pressure refrigerant via an expansion valve for refrigerative drying or with warm refrigerant via an unfreezing valve for melting frozen condensate in the evaporator. When the gas passage of one evaporator becomes clogged by frozen condensate, its gas and refrigerant expansion valves can be closed while its unfreezing valve is opened to promote thawing, and the gas and refrigerant expansion valves of the other evaporator can be opened so that refrigerative drying can take place in the other evaporator while the clogged evaporator thaws.

3 Claims, 4 Drawing Sheets

DEVICE FOR LOW TEMPERATURE REFRIGERATIVE DRYING OF COMPRESSED AIR (AND/) OR OTHER GASES

BACKGROUND OF THE INVENTION

The invention relates to a device for low temperature refrigerative drying of compressed air and other gases.

The motivation for the invention comes from the desire to provide a refrigerative drying device for air and/or other gases whereby the gas is cooled to several (or a number of) degrees below zero degrees Centigrade (<0° C.), wherewith the problem of plugging of lines with ice is solved, which plugging occurs when a drying device is employed which lowers the temperature below the critical temperature of 2° C. With the elimination of the plugging problem, the refrigeration of the gas successfully reduces the moisture content of the gas practically to zero.

If one observes a compressed air installation, it is quite clear that when moisture is present in the air there are major and costly consequences, because moisture causes oxidation and consequent degradation in the interior of the tubing, and attacks the pneumatic components (i.e., the components of the gas handling equipment, e.g., air cylinders or other actuators, instruments, etc.), with adverse effects on their performance. In a number of processes, moisture in the air will contaminate the product, and/or will increase costs due to interruptions and loss of production.

Liquid water develops in the tubes of compressed air equipment by condensation of the water vapor contained in the air, which condensation is brought about by natural decreases in ambient temperature. If, at a point disposed upstream of the point at which the compressed air enters the consuming network, the air is maximally refrigerated (i.e. to approximately 2° C.), and the water which condenses is removed by automatic drainage, one obtains air which is dry and is at its normal condition of use.

In current compressed air equipment of conventional types, moisture enters the equipment through an air/air heat exchanger, where it is pre-cooled, wherewith the condensation of water vapor begins. The air then passes to the "evaporator", which is an air/refrigerant gas heat exchanger, at the exit of which the air reaches its lower temperature, typically 2° C. It is cooled to the extent that most of the humidity which it contains is condensed. The condensed moisture is collected in a separator, where it is expelled through an automatic drainage trap. Before this cold, dry air passes into the distribution network it is passed through the (e.g. countercurrent) primary heat exchanger, where it serves to pre-cool the intake air. This heat exchanger saves power which might be consumed in cooling the intake air, and provides heat to the compressed air which avoids condensation on the exterior of the downstream compressed air lines. The compressed air processed in this manner contains approximately 0.66 grams water vapor per cubic meter of air.

The described conventional equipment meets the normal requirements of industry as long as there are no special conditions which necessitate a lower final moisture content in the air.

In order to achieve a lower final moisture content by means of the refrigeration system, the air must be compressed at <0° C., rather than the presently employed +2° C. However, when such lower temperature compression is attempted the water vapor is first condensed and then it begins to freeze, causing blockage of the tubes of the above-described primary heat exchanger due to the presence of ice, thereby eventually causing interruption of the process.

SUMMARY OF THE INVENTION

The object of the present invention is to alleviate this drawback.

The invention device is essentially comprised of:

(1) A condenser unit employing refrigerant gas;

(2) Two identical compressed air/gas refrigerant heat exchangers, designated as evaporators "Ev1" and "Ev2";

(3) A compressed air (intake)/compressed air (delivery) heat exchanger, designated the economizer "Ec";

(4) A timing device, which causes the inventive device to execute a predetermined repetitive cycle, which timing device operates by opening and closing electric circuits designated "control circuits"; and (5) A system of valves connected by tubing, which valves serve to open and close pathways i.e., "loops" in the inventive device, as described.

The set of elements described defines two systems, one for the compressed air and/or other gases and one for the refrigerant gas.

BRIEF DESCRIPTION OF THE DRAWINGS

In order to provide a concrete example of the advantages mentioned briefly aboveand with the understanding that users and those skilled in the art will be able to offer numerous additional examples, hereinafter there will be described a preferred exemplary embodiment in connection with the attached schematic drawings, which embodiment is not intended to be exclusive and does not limit the scope of protection of the invention but merely serves to illustrate and aid in explaining the basic concepts upon which the invention is based.

DETAILED DESCRIPTION OF THE INVENTION

Figure 1:
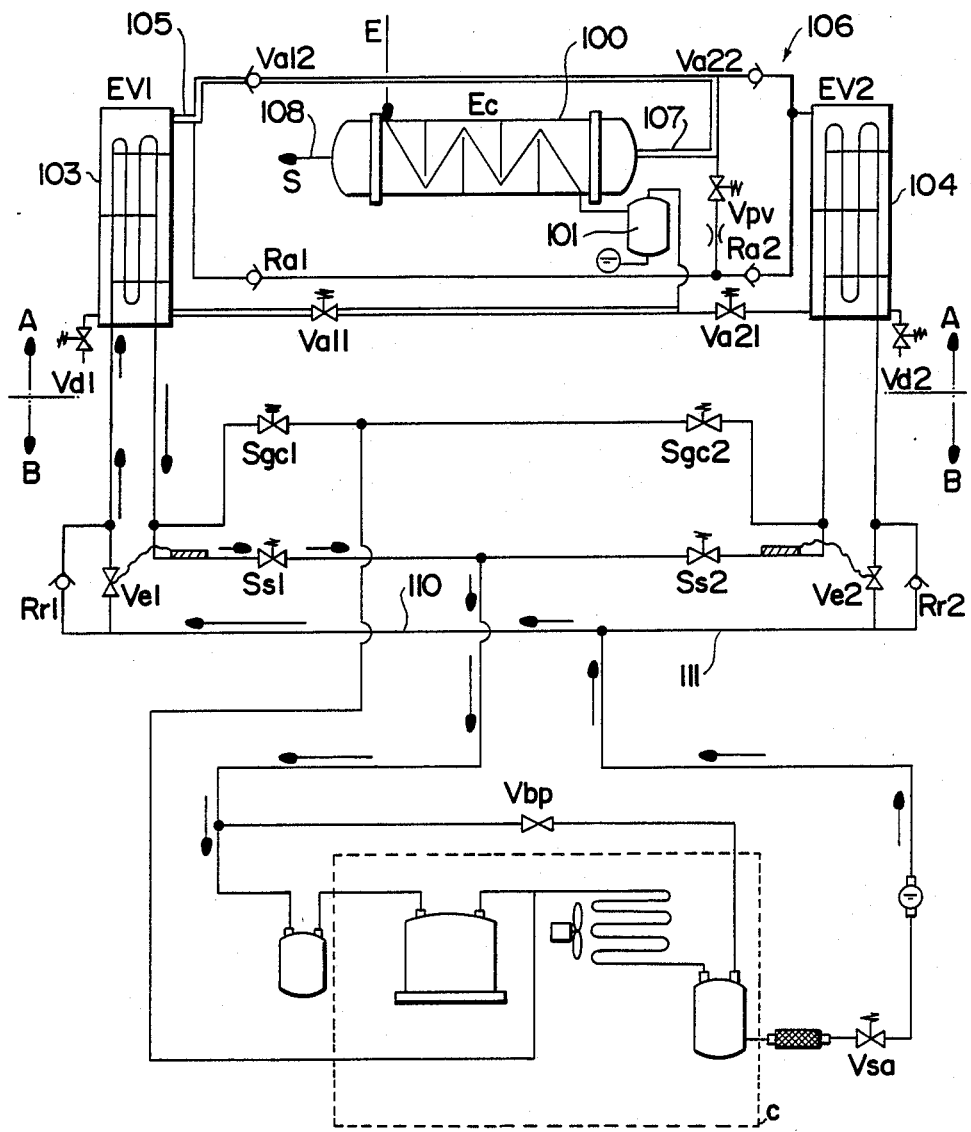
FIG. 1 is schematic diagram of the inventive device, with bold lines and directional arrows indicating the elements of one of the refrigeration sections, and the elements of the corresponding circuit of the air which is being processed.

In order to coordinate the drawings with the description which follows, elements or configurations have been assigned consistent reference numerals among the different Figures.

Figure 2:
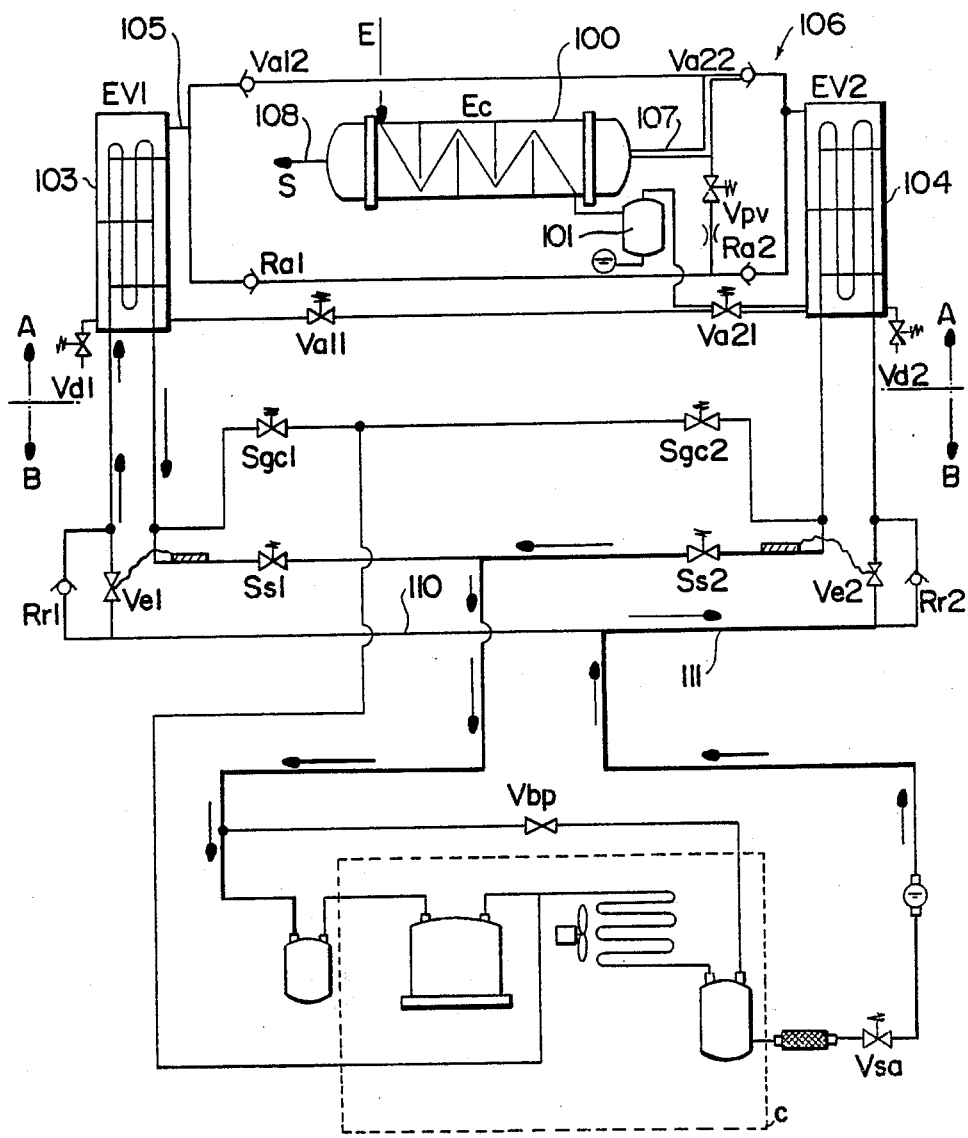
FIG. 2 is a schematic diagram analogous to FIG. 1, but with bold lines and directional arrows employed to indicate the elements of a second refrigeration section which is distinct from the first, and the elements of a circuit of the air which is being processed, which circuit corresponds to the second refrigeration section.

As briefly described above, the subject device for low temperature refrigerative drying of compressed air and/or other gases is comprised of:

A circuit through which the compressed air and/or other gases are passed and processed, which circuit contains two or more "evaporators" (as necessary) and occupies region A of FIGS. 1 and 2; and A circulation circuit B of the refrigerant gas which gas serves the "evaporators" and is furnished from a refrigeration condenser unit C.

The humid air passes through the "economizer" Ec 100 where heat exchange occurs and the air is pre-refrigerated.

At the outlet of the "economizer" 100, the humid air passes through an automatic valve (i.e. trap) 101 which expels the liquid, whereafter the path of the air is split, with branches leading to valves Va11 and Va21.

The valves Va11 and Va21 are connected to respective leakproof tanks 103, 104, through which the air to be treated is circulated. The tanks 103, 104 are equipped with respective "evaporators" Ev1, Ev2 associated with the refrigeration compressor C. The evaporators Ev1, Ev2 are always oriented vertically or on an incline, to allow collection and draining of the liquid.

The tanks 103, 104 have respective outlet lines 105, 106 for the processed air, leading to respective valves Va12, Va22 which connect via a line 107 to deliver the processed air to the "economizer" heat exchanger Ec 100 and thence to the outlet S designated at 108 as shown in FIGS. 1 and 2.

The "evaporators" Ev1, Ev2 ... (there may be more than two, if necessary) are connected to the condenser unit C by respective individual circuits which are mutually similar.

The circuit of the refrigerant gas of evaporator Ev1 includes the following: A high pressure refrigerant gas line 110 (as shown in FIG. 1) leads from the refrigerant condenser unit C to an expansion valve Ve1 which is connected by another line to the evaporator Ev1 contained in the leakproof tank 103. The outlet conduit from evaporator Ev1 then leads to a solenoid-operated suction valve Ss1, a valve Sgc1 for unfreezing by means of hot gas, and a return valve Rr1.

Referring to the drawings, the circuit of the refrigerant gas of the second evaporator Ev2 includes the following: A high pressure refrigerant gas line 111 (as shown in FIG. 2) leads from the refrigerant condenser unit C to an expansion valve Ve2 which is connected by another line to the "evaporator" Ev2 contained in the leakproof tank 104. The outlet conduit from "evaporator" Ev2 then leads to a solenoid-operated suction valve Ss2, a valve Sgc2 for unfreezing by means of hot gas, and a return valve Rr2 as shown in FIG. 2.

Figure 3:
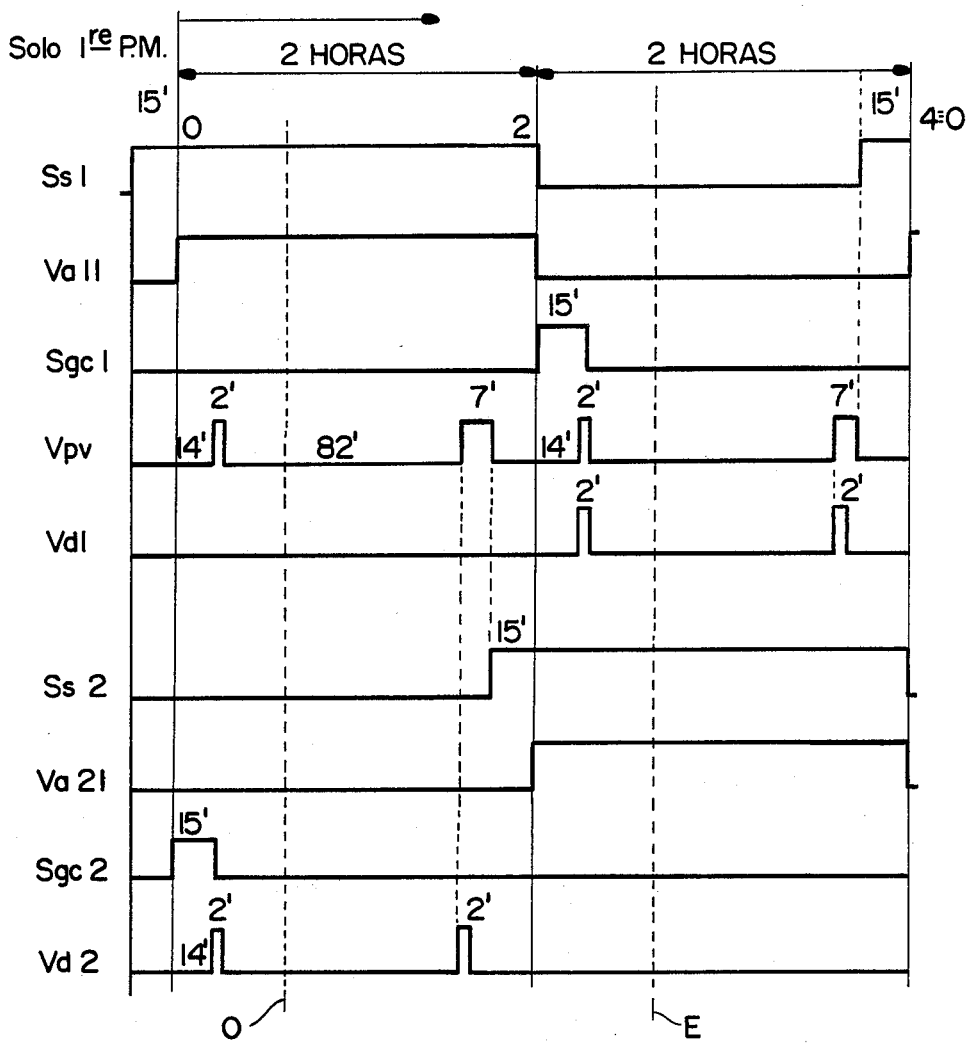
FIG. 3 is a plot of the control signals of the timer in the inventive device, which plot shows preferred actuation times for the various components of the inventive device, for automatic optimized operation of the device, where dotted lines D and E indicate the circuit control parameters of the operating modes (half cycles) shown in FIGS. 1 and 2, respectively.
Figure 4:
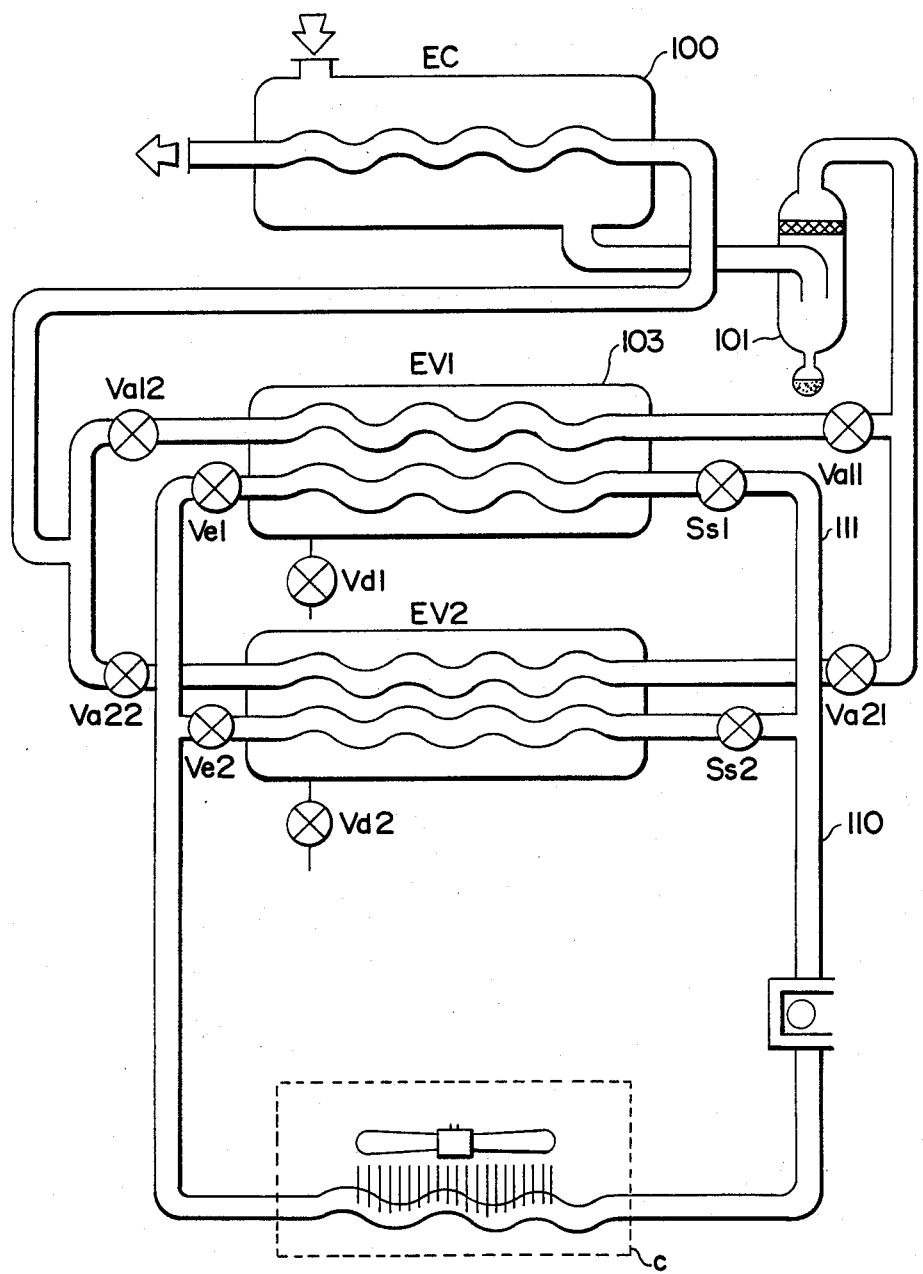
FIG. 4 is a general schematic diagram indicating tubing connections and distributing valves.

The inventive device operates in two half-cycles (or correspondingly more than two, if there are more than two evaporators), controlled automatically by a programmable control system as depicted in FIG. 3.

In a first half-cycle shown in FIG. 1, the valves Va11 and Ss1 are open and the others are closed. For an example of operation, it is assumed that the temperature is 32° C., which is typical of compressed air in an industrial environment. Of course, another temperature could be chosen.

The air, saturated with moisture at 32° C., enters the device at the economizer 100 and passes to the evaporator Ev1 where it is cooled to −25° C. It is passed to the economizer 100, where it is heated to 0° C. by the entering air, while the entering air is cooled from 32° C. to 6° C. prior to entering evaporator Ev1.

In the economizer 100, as the air is cooled from 32° C. to 6° C. the water vapor which exists in this temperature range is condensed, and the automatic valve (trap) 101 expels the condensate to the exterior.

The air at 6° C. then enters evaporator Ev1. As the air is cooled from 6° C. to −25° C. the water vapor which exists in this temperature range is condensed, and the condensate is immediately frozen on (i.e. the exterior of) the tubing of evaporator Ev1.

Saturated air at −25° C. is delivered from the outlet of evaporated Ev1. It enters the economizer Ec, where its temperature is increased from −25° C. to 0° C. The air at this point is at a pressure of 7 kg/cm2, and is practically dry, having a moisture content 0.067 g/m³ air.

The growing coating of ice (comprised of condensed water which has frozen) which is formed in the evaporator Ev1 eventually impedes the air circulation. In order to avoid this, a second, identical evaporator Ev2 is brought into operation according to a predetermined program, to execute the next half cycle comprising all the functions of evaporator Ev1 while evaporator Ev1 is being regenerated (by unfreezing of the ice, and expulsion of the resulting water to the exterior), whereupon evaporator Ev1 returns to active operation, taking over from evaporator Ev2, and so forth, in a continuous and automatic progression.

The refrigeration section of the device is comprised of a refrigerant gas condenser unit C which includes a motor, a compressor, a condenser, a reservoir, a filter, a high pressure solenoid valve Vsa, and a window 112.

The two similar circuits of the evaporators Ev1, Ev2 are supplied from and return to the refrigerant condenser unit C. As mentioned, these evaporators Ev1, Ev2 are alternatively in active operation in succession as shown in FIGS. 1 and 2.

The liquid refrigerant passes through expansion valve Ve1 and enters evaporator Ev1, where it is evaporated and extracts the heat of the compressed air thereby lowering the air from 6° C. to −25° C. It then passes through valve Ss1 and returns to the suction accumulator and suction intake of the compressor. As mentioned, ice accumulates in the evaporator due to the freezing of the water condensate, which tends to block the passage of the air. To avoid this blockage and to make it unnecessary to interrupt the circulation of the air, the compressed air is then passed through the second evaporator Ev2 which has been brought to the prescribed temperature (−27° C.) by opening the suction valve Ss2 to enable circulation of the liquid refrigerant in Ev2.

To maintain continuity of operation, the first evaporator Ev1 must now be regenerated, whereafter it can timely take over from evaporator Ev2.

At the same time that the air stops circulating through evaporator Ev1 due to the closure of valves Va11 and Va12 by the controller, it is passed through evaporator Ev2 by the opening of valves Va21 and Va22 by the controller, with simultaneous closing of valve Ss1 and opening of valve Sgc1 to enable warm refrigerant gas to enter evaporator Ev1 so as to melt the ice coating which covers the tubes in evaporator Ev1. Immediately before closing valve Sgc1, valves Vd1 and Vpv are briefly opened, to expel melted ice via valve Vd1, depressurize evaporator Ev1, and eliminate all liquid residue from the interior. The opening of valve Vpv enables passage of a small additional volume of air which improves the purging. Then, after 2 minutes as shown in FIG. 3, valves Vd1 and Vpv are re-closed. After passage of sufficient time, just before re-utilizing the evaporator Ev1 which has now been regenerated, the valves Vd1 and Vpv are re-opened to allow any residual liquid water to be expelled through Vd1. At 2 minutes, valve Vd1 is closed but not valve Vpv. This causes evaporator Ev1 to be pressurized; then at 5 minutes, valve Vpv is closed and simultaneously valve Ss1 is opened, to bring the evaporator Ev1 to the prescribed temperature ($-27°$ C.). The complete cycle is then repeated.

It is apparent that, while the described exemplary embodiment of the invention is intended for removal of moisture in air, particularly compressed air, the scope of the invention extends to any other type of gas which is to be dehumidified (i.e. freed of moisture), and the invention is well suited to this task.

The structural and functional advantages which characterize the invention may be seen from the above description and from the accompanying drawings, and need not be specified in more detail, except to state that the inventor retains the right to introduce additional modifications in the nature of details, without departing from the limits and scope of the claimed matter.

I claim:

1. A device for low temperature refrigerative drying of compressed air and other gases, comprising:
    gas/gas heat exchanger means for pre-refrigerating a gas to be dried, said gas/gas heat exchanger means having a first gas passage having an inlet for admission of a gas to be dried thereinto and an outlet for discharging pre-refrigerated gas therefrom, said gas/gas head exchanger means further having a second gas passage in heat-exchanging relation with said first gas passage, said second gas passage having a refrigerated gas inlet for admitting refrigerated gas thereinto and an outlet for discharging refrigerated gas therefrom;
    trap means in communication with the outlet of the first gas passage of the gas/gas heat exchanger means for expelling liquid from the pre-refrigerated gas, and having a gas outlet;
    a first pre-refrigerated gas valve for selectively communicating with the gas outlet of the trap means;
    a second pre-refrigerated gas valve for selectively communicating with the gas outlet of the trap means;
    a refrigerant gas condenser unit means for providing high pressure refrigerant via a high pressure refrigerant supply line, for providing warm refrigerant via a warm refrigerant supply line, and for receiving circulated refrigerant via a refrigerant return line;
    first evaporator means for refrigeratively drying pre-refrigerated gas discharged from the gas/gas heat exchanger means, said first evaporator means including:
    a first tank;
    a first gas refrigeration passage provided in said said first tank and having a pre-refrigerated gas inlet communicating with said first pre-refrigerated gas valve for admitting pre-refrigerated gas into said first gas refrigeration passage when said first pre-refrigerated gas valve is open, said first gas refrigeration passage also having a refrigerated gas outlet for discharging refrigerated gas from said first refrigerated gas passage; and
    a first refrigerant circuit provided in said first tank in heat-exchanging relation with said first gas refrigeration passage, said first refrigerant circuit being selectively communicable at an inlet thereof with the high pressure refrigerant supply line via a first expansion valve and a first return valve, said first refrigerant circuit being selectively communicable at an outlet thereof with the warm refrigerant supply line via a first solenoid-operated unfreezing valve and with the refrigerant return line via a first solenoid-operated suction valve;
    second evaporator means for refrigeratively drying pre-refrigerated gas discharged from the gas/gas heat exchanger means, said second evaporator means including:
    a second tank;
    a second gas refrigeration passage provided in said said second tank and having a pre-refrigerated gas inlet communicating with said second pre-refrigerated gas valve for admitting pre-refrigerated gas into said second gas refrigeration passage when said second pre-refrigerated gas valve is open, said second gas refrigeration passage also having a refrigerated gas outlet for discharging refrigerated gas from said second refrigerated gas passage; and
    a second refrigerant circuit provided in said second tank in heat-exchanging relation with said second gas refrigeration passage, said second refrigerant circuit being selectively communicable at an inlet thereof with the high pressure refrigerant supply line via a second expansion valve and a second return valve, said second refrigerant circuit being selectively communicable at an outlet thereof with the warm refrigerant supply line via a second solenoid-operated unfreezing valve and with the refrigerant return line via a second solenoid-operated suction valve;
    a first refrigerated gas valve for selectively communicating the refrigerated gas outlet of the first refrigerated gas passage of the first evaporator means with the refrigerated gas inlet of the second gas passage of the gas/gas heat exchanger means; and
    a second refrigerated gas valve for selectively communicating the refrigerated gas outlet of the second refrigerated gas passage of the second evaporator means with the refrigerated gas inlet of the second gas passage of the gas/gas heat exchanger means.

2. A device according to claim 1, wherein said first and second evaporator means are selectively alternately operable for refrigeratively drying the pre-refrigerated gas such that, while one of said first and second refrigerant passages may be selectively supplied with high pressure refrigerant via its respective expansion valve, the other of said first and second refrigerant passages may be selectively supplied with warm refrigerant via its respective unfreezing valve.

3. A device according to claim 1, wherein more than two evaporator means, each connected with the gas/gas heat exchanger and the refrigerant gas condenser unit means via respective valves, are provided.

* * * * *